Aug. 17, 1954     D. D'EUSTACHIO     2,686,342
SEALING OF OPENINGS IN GLASS
Filed May 13, 1949     3 Sheets-Sheet 1

Inventor
DOMINIC D'EUSTACHIO
By Olen E. Bee
Attorney

Aug. 17, 1954   D. D'EUSTACHIO   2,686,342
SEALING OF OPENINGS IN GLASS
Filed May 13, 1949   3 Sheets-Sheet 2

Inventor
DOMINIC D'EUSTACHIO
By
Olen E. Bee
Attorney

Aug. 17, 1954

D. D'EUSTACHIO 2,686,342

SEALING OF OPENINGS IN GLASS

Filed May 13, 1949

Inventor
DOMINIC D'EUSTACHIO

By Olen E. Bee
Attorney

Patented Aug. 17, 1954

2,686,342

UNITED STATES PATENT OFFICE 2,686,342

SEALING OF OPENINGS IN GLASS

Dominic D'Eustachio, Port Allegany, Pa., assignor, by mesne assignments, to Pittsburgh Plate Glass Company, Pittsburgh, Pa., a corporation of Pennsylvania Application May 13, 1949, Serial No. 93,177

14 Claims. (Cl. 20—56.5)

The present invention relates to double glazed units comprising spaced plates of glass hermetically sealed together about their edges and it has particular relation to the sealing of the pores or vents employed for equalization of the pressures between the inside and outside of a double glazed unit, the spaced plates of which are united by glass sealing elements or portions providing a vitreous bond between the plates.

One object of the invention is to provide a system for sealing the pore holes employed to vent double glazed units during manufacture which provides an effective barrier to moisture over long periods of time.

A second object is to provide a pore closure which is not subject to separation from the glass to which it is applied in normal operation.

A third object is to provide a pore closure which can be applied when the units are at low or atmospheric temperatures.

A fourth object is to provide a pore closure which is easy to apply in a commercial operation.

These and other objects of the invention will be apparent from the following specification and the drawings pertaining thereto.

Many years ago it was proposed to provide glazing for windows comprising spaced plates of glass, the edge portions of which were appropriately sealed together to provide a dead air chamber of high insulative value. The idea, of course, seems rather simple; but in actual practice great difficulty has been encountered in the provision of an effective seal about the edge portions of the unit. If the edges are not completely sealed, air and water vapors quickly permeate into the unit so that when the latter is exposed to low temperatures, water vapors condense out on the inner faces of the glass and may be converted into ice. The water, in time, by its repeated collection and evaporation within the unit as the temperatures change, causes scumming and decomposition of the glass surface. This permeation of moisture can take place relatively freely through or about any of the plastic media which have been tested as a seal between plates in a double glazed unit.

A great deal of effort has been spent in an attempt to overcome this defect. One suggestion for the solution of the problem is contained in the patent to Guyer et al., No. 2,389,360, in which it is proposed to form an hermetically sealed double glazed unit having the edge portions of one plate folded toward, and fused or welded to the other. This construction is obtained in the patented process by applying stripes of a conductive material, such as aquadag, near the edges of two plates of glass, supporting the plates in horizontal position one above the other, passing an electrical current through the stripes to generate heat sufficient to soften the contiguous glass, and allowing the edge portions of the upper plate to droop down. The dropped edge portions are then brought into contact with the lower plate, and the contacting portions of the glass are fused together to provide a continuous welded glass seal. The units are then cooled in a lehr to anneal the glass.

In a later and improved technique as disclosed in an application by William R. Clever and Harry O. Phalin, filed December 28, 1948, Serial No. 67,696, now abandoned, and entitled "Welded Double Glazed Unit," two plates of glass are juxtaposed with only about a sixteenth of an inch space between them. Preferably, the upper plate is about a quarter or an eighth of an inch wider than the lower, in both horizontal dimensions. It is also provided with marginal conductive stripes, and one of the plates is pierced to provide the necessary vent, preferably near a corner. The plate with the stripes is heated electrically, as per the Guyer et al. patent, at the margins so that the margins droop and become thoroughly welded to the lower plate. The upper plate is then pulled upwardly, by a vacuum device, to provide the necessary spacing of the plates, and may be vibrated up and down slightly to cause the glass at the union to become thoroughly filleted. Subsequently, the units are annealed and the vents are sealed by the technique herein described.

It has also been proposed to form glass-sealed, double glazed units by spacing sheets of glass by means of strips of glass, the edges of which have been coated with a paste of a powder of a glass having a low fusing point, and then heating the assembly to fuse the paste and provide a seal between the joints of the assembly.

In forming units by these and similar methods, it will be obvious that the gases between the plates of glass become highly heated and expanded. As these heated gases cool down during the annealing operation, the gases contract, thus tending to set up a vacuum within the unit. In order to prevent the collapsing or shattering of the units by the resultant differential of pressure, the units are customarily formed with small openings at some convenient point through which gases can enter the units. Of course, unless these small pore holes or vents are adequately sealed after the units are cooled, the water vapors could enter the units at will and thus destroy their utility. The adequate sealing of these pore holes or vents has constituted one of the main problems in the construction of units by the patented method. Practically all organic adhesive materials are characterized by permeability to moisture and may even contain moisture themselves, so that where the pore holes are sealed with organic plastics alone, water vapors soon enter the unit even through the small path provided by the pore to the extent that they will condense out or even freeze at winter temperatures.

The present invention is based upon the provision of a pore hole seal for welded or otherwise glass sealed double glazed units, embodying a metallic tubular sleeve or eyelet secured in the pore hole by means of a low fusion glass of a coefficient of expansion approximating that of the glass of the sheets from which the double glazed units are formed, the sleeve in turn being closed by means of a suitable metallic screw threaded and sealed into the sleeve.

For a better understanding of the invention, reference may now be had to the accompanying drawings in which like numerals refer to like parts throughout, and in which.

Figure 1:
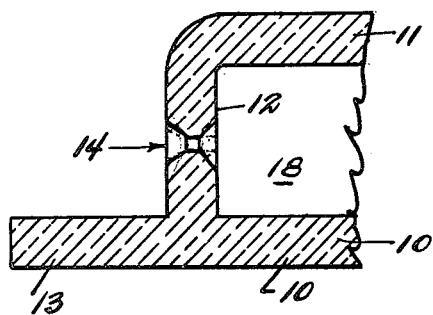
Fig. 1 is a view, partially in section and partially in elevation, of one type of unit embodying the principles of the invention.

A double glazed unit embodying the principles of the invention conveniently comprises spaced plates of glass 10 and 11, best shown in Fig. 1. The latter plate may have marginal portions 12 bent down and welded to the upper face of the plate 10, by the process and apparatus shown in Patent 2,389,360 to Guyer et al. The welding may be substantially at the edge of the plate 10 or, as shown in the drawings, it may be spaced a distance from the edge in order to provide a flange 13 which is one thickness of glass and may be puttied or otherwise secured in any opening which it is desired to glaze.

The pore and closure are indicated generally by the numeral 14 and may be disposed at any convenient point in the construction, but as shown in the drawings, they are disposed in the downwardly bent flange 12. A single opening may be formed, but more may be provided as indicated at 16. Gases, such as air, can be blown into the opening in order to quickly sweep out the moist gases inherently within the chamber 18.

The closure construction and several of the stages embodied in the installation thereof, as applied to the units prepared in accordance with the Guyer patent or the Clever at al. application, are shown on a greatly enlarged scale in the drawings. The construction as shown, includes an opening 19 (Fig. 4) formed near the edge portion of a sheet of glass. This opening may be outwardly flared, for example, at an angle of approximately 60° at its outer face. It may also be inwardly flared at the inner face of the edge wall 12 if so desired. The intermediate portion 21 of the glass as shown may be cylindrically bored or slightly tapered.

The closure construction for the unit includes a sleeve or eyelet element 22, preferably formed of a metal which is resistant to oxidation and which is at least fairly highly infusible. The heat resistant steels known as stainless steels may be employed in its construction. The eyelets include a cylindrical, or nearly cylindrical portion 23, which is internally screw threaded, and an outwardly flared top portion 24 which is adapted to seat in the conical portion of the vent or pore opening. Eyelet and screw should closely match the coefficient of expansion of the glass.

It is to be observed that the sleeve is exteriorly coated with and bonded to a layer 25 of glass which is also preferably bonded or welded to the contiguous glass of the edge wall 12. The layer of glass 24 preferably has a lower softening or fusing point than the contiguous glass, but it should have a coefficient of thermal expansion approximating fairly closely that of the glass to which it is united. The composition of such low fusion glass, of course, will vary dependent upon the point of melting desired therein, and also the coefficient of thermal expansion of the glass to which it is to be bonded. Usually, the thermally welded units will be formed of conventional lime soda glass which is the least expensive of all of the glasses available for the purpose. Any other glass could also be employed. A bonding glass for securing the eyelets in the openings in plates composed of such glass, is preferably fused as a coating on the eyelet before the latter is inserted.

It may conventionally embody high percentages of lead oxide, boric oxide, and alumina. By appropriately adjusting these components in the glass, practically any coefficient of thermal expansion can be closely matched, and at the same time the fusion point of the bonding glass can be maintained sufficiently low to assure that it will bond to the glass contiguous the pore, during the welding operation.

A convenient mode of coating the exteriors of the eyelets with low melting glass, involves threading the eyelet upon a small mandrel and heating the mandrel in a flame so that the eyelet becomes heated to the fusing point of the glass. The glass may then be adhered by rubbing a rod thereof against the eyelet.

The sleeve 22 in the assembly is closed by means of screw 26 which preferably comprises a thread portion 27, and a frustoconical head 28 corresponding to the interior of the sleeve or eyelet 22 and having a slot 28a for a screw driver. If the eyelet and screw are accurately fitted, the contact between the metal surface may be relied upon to keep out air and moisture. However, preferably, the threads of the screw are coated with a layer 29 of plastic material designed to provide a permanent seal between the threads of the sleeve and the threads of the screw. Appropriate plastics for the purpose of sealing the threads include rubber latex suspensions, synthetic rubber such as Thiocol, methyl methacrylate polymers, rubber polymers and isomers, vinyl acetal resins such as are employed in safety glass, and many others. A convenient composition includes a liquid mixture of a glyptal or alkyd resin and a "silicone" or silicon ester resin. The glyptal resin is a polyester of glycerol and phthalic acid. It may include a drying oil acid or other fatty acid, e. g. linolenic acid, in a proportion, for example, of equal mols per mol of phthalic acid. These two components may be combined over a relatively broad range, e. g. 10 to 90% of the former to a corresponding range of the latter. The preparation of these types of resins is a conventional procedure, and both types can be purchased commercially.

If desired, the outer face of the closure assembly and the contiguous glass may be given a coating 32 of a low fusion metal. The term includes lead, and low melting alloys such as solder, Rose's metal, and others.

Figure 3:
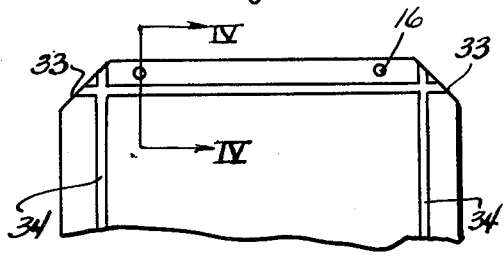
Fig. 3 is a fragmentary plan view of a glass plate appropriately striped and having the pore holes formed therein prior to the formation of double glazed units.
Figure 4:
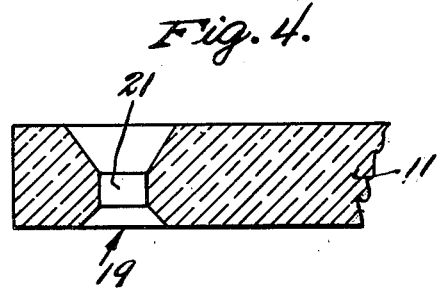
Fig. 4 is a fragmentary sectional view taken substantially along the line IV—IV of Fig. 3.
Figure 5:
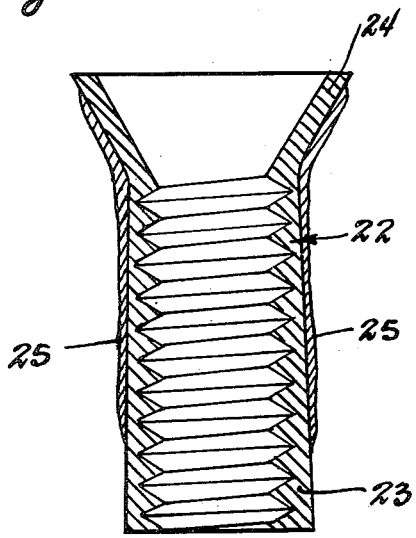
Fig. 5 is a fragmentary sectional view showing a sleeve having a coating of glass of low fusion point thereupon.
Figure 6:
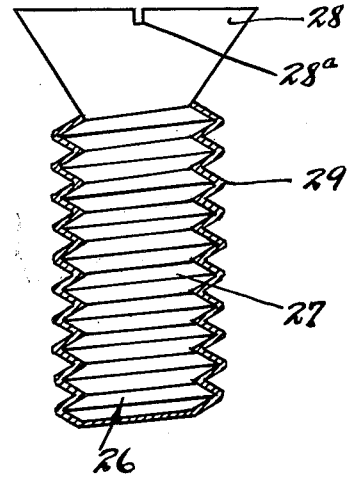
Fig. 6 is a detailed view, partly in elevation and partly in section, of a screw employed to close the sleeve shown in Fig. 5.

In the formation and sealing of the unit in accordance with the provisions of the present invention, the techniques of heating the glass and uniting the heated portions to form the units follows conventional procedures such as are exemplified by the foregoing patent to Guyer et al. A glass plate that has been appropriately bored to form pore holes as indicated in Fig. 4 of the drawings is employed as one side 11 of a unit. The holes may have the sectional configuration shown in the drawings or any other suitable configuration. Plates 11 after they have been bored may have the corner portions thereof clipped at an angle of 45° as indicated at 33 in Fig. 3. The edges of the glass may also be "seamed" or smoothed by contacting them lightly with the sanding belt or other abrasive member.

The plates should be thoroughly cleaned and the stripes of a conductive material indicated at 34 are applied. Appropriate conductive material comprises "aquadag" which is a suspension of graphite in water. The stripes may be applied by rollers, by brushing or any other appropriate technique.

The sleeves or eyelets 22 having coatings 25 of low fusion glass adherent thereabout are inserted in the openings at this stage of the operation. Of course, the sleeve and the coating thereupon are slightly less in exterior diameter than the internal diameter of the pore opening.

After the sleeves or eyelets have been inserted the plates are superposed in spaced relation and current is applied to stripes 34 to soften, form and fuse together the edges of the plates. The heating is in accordance with the technique described in the foregoing Guyer patent. If the pore hole or vent is near the edge of the glass, the eyelet becomes highly heated, e. g. to 1500° F. by the electrical current. The glass coating upon the eyelet fuses to the contiguous surface of the pore hole, and the eyelet settles into position. After the units have been formed and annealed, they are withdrawn from the annealing apparatus (not shown).

Figure 9:
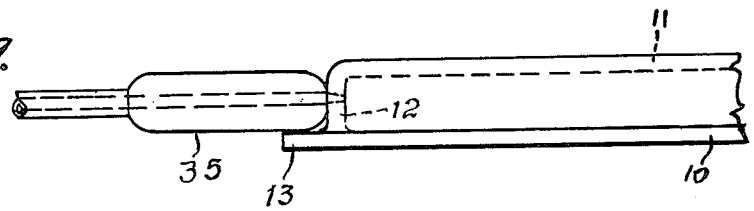
Fig. 9 illustrates the step of purging a unit in order to eliminate moisture therefrom.

The gases contained in the units may conveniently be expelled by forcing a dried gas, such as dried air, into one of the pore openings by means of a nozzle 35, shown in Fig. 9, and allowing it to flow out of the other pore opening. When the units are sufficiently purged, the pore openings are closed by insertion of a screw 26 in each opening. Of course, the screws are properly coated with plastic, prior to insertion. A plastic coating may be conveniently applied by dipping the screws in, or spraying them with a solution of the desired plastic, and then allowing the solvents to evaporate. Dipping the screws in molten plastic, or dusting the screws, while heated, with fusible plastic, are contemplated.

An appropriate technique of coating the screw would involve cleaning the latter of grease, e. g. by dipping in a solvent, such as carbon tetrachloride. Operations are facilitated if the screw and the area about the pore hole or vent are warmed, for example, to about 100° C. This temperature might be lower or even much higher, e. g. 200° C.

The screw may be dipped into a solution of plastic. A convenient solution would comprise 2 cc. of silicone ester, e. g. such as is described in U. S. Patents 2,386,452 or 2,386,793, in 10 cc. of toluol. To 1 part by volume of this solution is added twenty parts by volume of glyptal resin.

The screw is shaken free of solution, and is then inserted in the eyelet and tightened up. Subsequently, the assembly is baked at 100° C. for a period which may vary from 10 minutes to many hours, e. g. 4 or 5 hours. A good average would be 1½ hours.

When the screws have been inserted, the head of the assembly may be covered by means of the fusible metal or alloy indicated at 32. Various modes of application may be employed. A convenient method or mode includes priming the surfaces by spraying molten metal against the outer face of the assembly, or projecting powdered metal against the face to be coated and then applying a coating of molten solder with a torch or hot iron. The mode of applying such coating is not particularly a feature of the present invention.

It is to be understood that the coating of the assembly with solder or other fusible metal is optional and by way of precaution to prevent possible tampering with the screw. In some cases it may not be required. The screw provides an adequate seal without further treatment.

The application of the principles of the invention to the sealing of purging holes in double glazed units is not limited to the process or product illustrated in the Patent 2,389,360. It has heretofore been proposed to prepare double glazed units by spacing a plurality of plates of glass by means of narrow strips of glass the edges of which are sealed to the contiguous plates by means of a bonding medium such as a glass or glaze having a low fusion point. The heating of such units to fuse the bonding agent to the glass plates inherently results in heating and expansion of the gases in the units so that the units must be provided with vent holes to allow gas to flow out or in as the temperature rises or falls. These vents of course must be sealed in the finished units to exclude moisture. The seal above described may be employed for the purpose.

Figure 10:
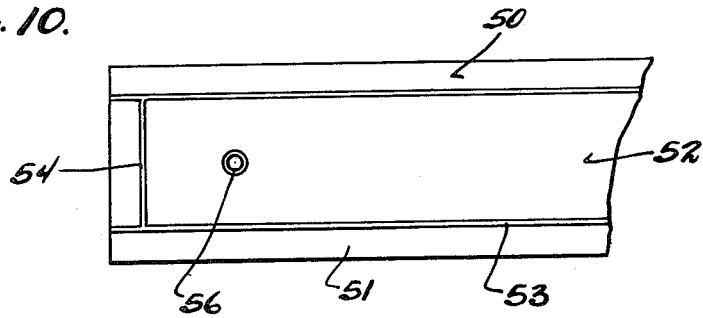
Fig. 10 is a fragmentary elevational view of a modified structure to which the invention may be applied.
Figure 11:
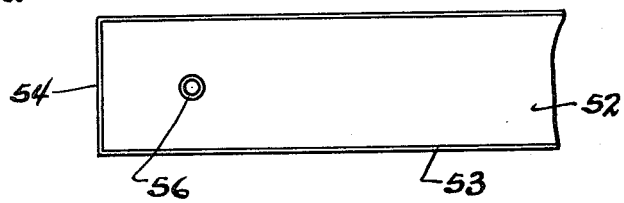
Fig. 11 is a fragmentary elevational view of a spacer strip for the construction shown in Fig. 10.

The application of this embodiment is illustrated in Figs. 10 and 11 of the drawings. In the drawings, plates 50 and 51 of glass are spaced by narrow strips of glass 52 the edges of which are bonded to the plates by thin layers of low fusion glass or glaze indicated at 53. A similar layer 54 is also disposed between the overlapping end portions of the strips.

Figure 2:
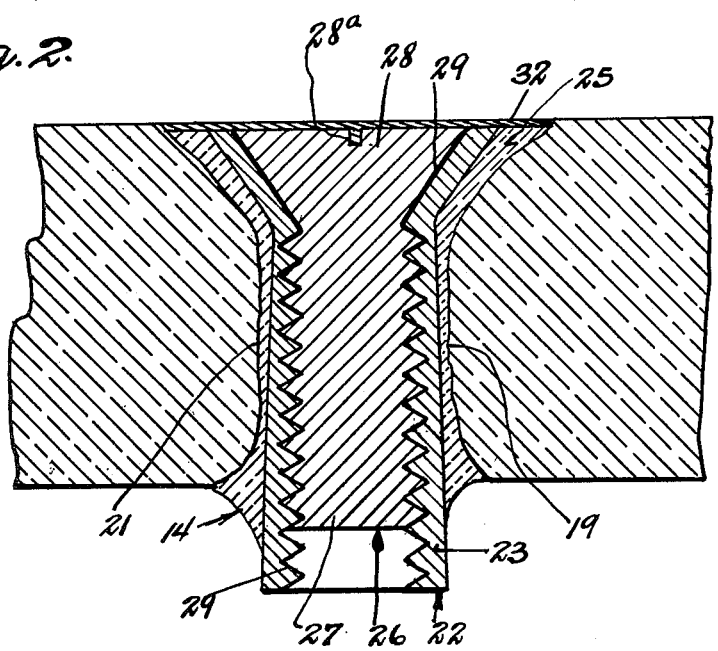
Fig. 2 is a sectional view of a fragment of a double glazed unit showing the vent or pore of the invention on a large scale.
Figure 7:
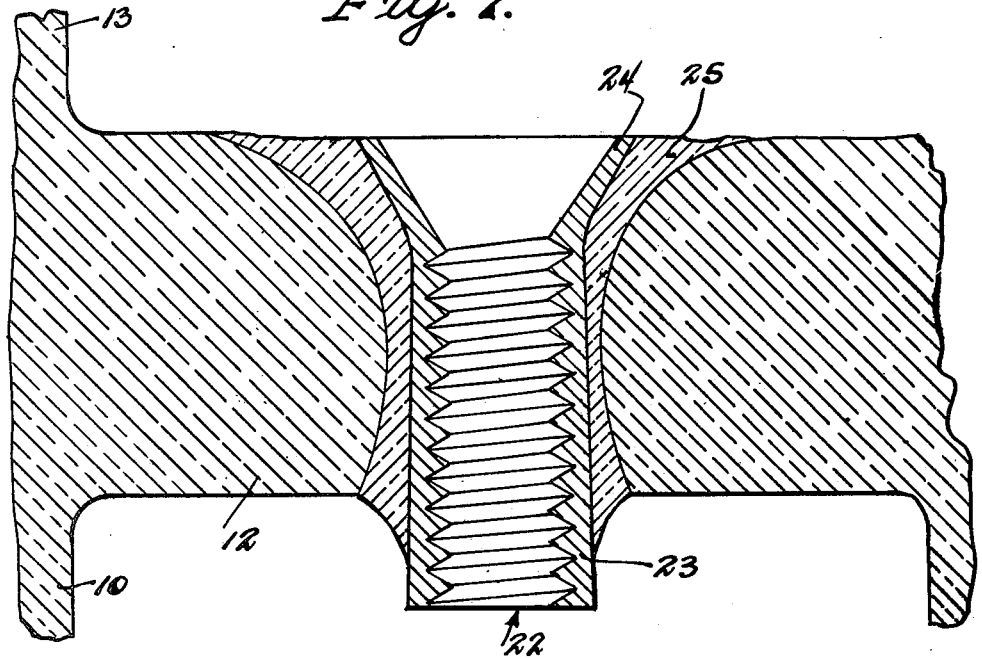
Fig. 7 is a fragmentary sectional view of a unit showing the pore closure eyelet in position but before the seal is applied thereto.
Figure 8:
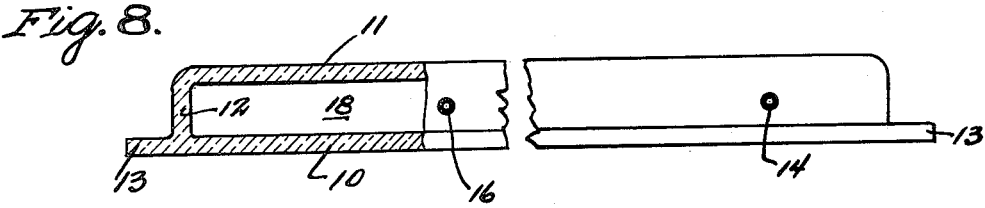
Fig. 8 is a view partially in section and partially in elevation of a unit embodying the invention.

Pore holes 56 similar to the pore or vent holes 17 are formed in one or more of the strips and these holes are closed in the finished construction by eyelets 22 and screw 26. Since the construction of the pore and the closure corresponds exactly to Fig. 2, re-illustration of the constructional details is not deemed necessary.

In the assembly of the construction, pore holes are drilled in one or more of the strips 52. The edges of strips may also be lightly seamed by abrasion. Subsequently, the strips are thoroughly cleaned and dried. The edges of the strips may then be given coating 53 of low melting glass or glaze, corresponding as nearly as possible, in its coefficient of thermal expansion, to the glass to which it is applied. The glaze may be in the form of a paste of powdered glass which will adhere to the surfaces to which it is applied. The units are then assembled. The eyelets may be inserted in the purging vents either before or after the parts are assembled.

To fuse the low melting glass of layers 53, 54, and the layer 26 upon the eyelet, the units are placed in a furnace (not shown) and heated thoroughly to bond the various parts together into a unit. The units are then annealed and cooled. Subsequently, they are purged with a dry gas, such as air, and are sealed in the same manner as the units already described.

Figure 12:
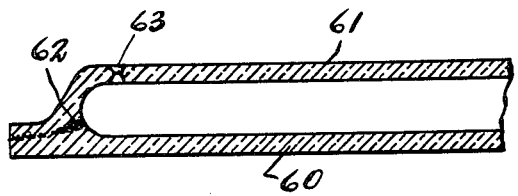
Fig. 12 is a fragmentary sectional view of a unit constructed in accordance with the method shown in Clever et al. application, Serial No. 67,696 of December 28, 1948.

The same mode of operation may be employed in sealing the construction illustrated in Fig. 12, which embodies a unit of the type illustrated by Clever et al., Serial No. 67,696, of December 28, 1948, now abandoned. In this construction, the plates of glass 60 and 61 are welded together as indicated at 62. A vent or pore hole 63 is formed therein, in the manner already described. Preferably, it is disposed in the face of the unit, but near a corner or edge, where it will be concealed by putty, or at least will be inconspicuous. This vent will be sealed in precisely the manner already described.

It will be apparent that the pore closure provides a convenient means of inserting and efficiently sealing a metallic closure element in a purging pore of a unit, whereby to provide a durable barrier to the entrance of moisture. The final sealing operation can be effected at normal atmospheric temperatures and pressures, so that the pressure within the unit at completion is very nearly atmospheric.

It will be understood by those skilled in the art that the embodiments of the invention herein described are given by way of example. It will be apparent that numerous modifications may be made therein without departure from the spirit of the invention or the scope of the appended claims.

I claim:

1. A pore closure structure for hermetically sealed double glazing units, comprising a metal sleeve having an internally threaded opening therein, a coating of glass of low fusion point adhered to the periphery of said sleeve for a distance equal to the depth of the pore opening in a wall of the unit and forming a vitreous bond with the glass of the unit when heated after insertion of the sleeve in the pore opening, and a screw for closing the sleeve opening after the sleeve is bonded within the pore opening.

2. In a pore closure structure for hermetically sealed double glazing units, the combination of a cylindrical metal sleeve member having a flared outer end, an internally threaded aperture extending through the sleeve, a coating upon the periphery of the sleeve forming a vitreous bond with the glass of the unit when the coating is heated after inserting the sleeve in the pore opening of the unit, and a screw for insertion into the sleeve aperture to form a seal therefor.

3. A pore closure structure as in claim 1, in which the screw is coated with a plastic composition to completely seal the minute openings between the base of the screw threads and the wall of the sleeve aperture.

4. A pore closure structure as in claim 1, in which the periphery of the sleeve and the screw are coated with a metal of low fusion point to heat-seal them in position after assembly in the pore opening of the unit.

5. The method of sealing a pore opening of a double glazing unit, comprising the steps of providing a pore opening in the face of one of the two spaced glass sheets forming the unit, coating the external periphery of an internally threaded, hollow, non-deformable sleeve member with glass having a low fusion temperature, inserting the coated sleeve member into the pore opening, superposing the glass plates in spaced relation and heating the edges thereof to fusion temperature to form a glass to glass seal between the marginal edges of the sheets, the glass in the one sheet adjacent the pore opening being raised to the fusion temperature of the glass coating of the sleeve and sealing the sleeve in position, annealing the entire unit, filling the unit with dry air through the internal opening of the sleeve, then closing the internal opening of the sleeve with a screw member engaging the internal threads of the sleeve.

6. The method as in claim 5 in which the screw member is coated with a plastic material to form a moisture proof seal at the root of the threads of the screw when assembled within the sleeve.

7. A method of sealing a pore opening of a multiple glazed unit which comprises providing a pore opening in one of the spaced glass sheets forming the unit, coating the external periphery of a hollow sleeve member with glass having a low fusion temperature, inserting the coated sleeve member into the pore opening, heating the edges of the glass sheets to fusion temperature to form a glass to glass seal between the marginal edges of the sheets, the glass in the one sheet adjacent the pore opening being raised to the fusion temperature of the glass coating on the sleeve member thereby sealing the sleeve in position, and closing the opening in the sleeve member.

8. A method of sealing a pore opening of a multiple glazed unit which comprises providing a pore opening in one of the spaced glass sheets forming the unit, coating the external periphery of a hollow sleeve member with glass having a low fusion temperature, inserting the coated sleeve member into the pore opening, heating the edges of the glass sheets to fusion temperature to form a glass to glass seal between the marginal edges of the sheets, the glass in the one sheet adjacent the pore opening being raised to the fusion temperature of the glass coating on the sleeve member thereby sealing the sleeve in position, annealing the entire unit, and closing the opening in the sleeve member.

9. A method of sealing a pore opening of a multiple glazed unit which comprises providing a pore opening in one of the spaced glass sheets forming the unit, coating the external periphery of a hollow sleeve member with glass having a low fusion temperature, inserting the coated sleeve member into the pore opening, heating the edges of the glass sheets to fusion temperature to form a glass to glass seal between the marginal edges of the sheets, the glass in the one sheet adjacent the pore opening being raised to the fusion temperature of the glass coating on the sleeve member thereby sealing the sleeve in position, filling the unit with a dry gas through the internal opening of the sleeve, and closing the opening in the sleeve member.

10. A method of sealing a pore opening of a multiple glazed unit which comprises providing a pore opening in one of the spaced glass sheets forming the unit, coating the external periphery of a hollow sleeve member with glass having a low fusion temperature, inserting the coated sleeve member into the pore opening, heating the edges of the glass sheets to fusion temperature to form a glass to glass seal between the marginal edges of the sheets, the glass in the one sheet adjacent the pore opening being raised to the fusion temperature of the glass coating on the sleeve member thereby sealing the sleeve in position, annealing the entire unit, filling the unit with a dry gas through the internal opening of the sleeve, and closing the opening in the sleeve member.

11. A method of sealing a pore opening of a multiple glazed unit which comprises providing a pore opening in one of the spaced members forming the unit, coating the external periphery of an element having an opening therein with glass having a low fusion temperature, inserting the coated element into the pore opening, heating the edges of the glass members to form the multiple glazed unit, the area adjacent the pore hole being raised to the fusion temperature of the glass coating on the coated element thereby sealing the coated element in position, and closing the opening in the coated element.

12. A method of sealing a pore opening of a multiple glazed unit which comprises providing a pore opening in one of the spaced glass sheets forming the unit, coating the external periphery of a hollow sleeve member with glass having a low fusion temperature, inserting the coated sleeve member into the pore opening, superposing the glass sheets in spaced relation and heating the edges thereof to fusion temperature to form a glass to glass seal between the marginal edges of the sheets, the glass in the one sheet adjacent the pore opening being raised to the fusion temperature of the glass coating on the sleeve member thereby sealing the sleeve in position, and closing the opening in the sleeve member.

13. A method of sealing a pore opening of a multiple glazed unit which comprises providing a pore opening in one of the spaced glass sheets forming the unit, coating the external periphery of a hollow sleeve member with glass having a low fusion temperature, said sleeve member being adapted internally to receive a screw member, inserting the coated sleeve member into the pore opening, superposing the glass sheets in spaced relation and heating the edges thereof to fusion temperature to form a glass to glass seal between the marginal edges of the sheets, the glass in the one sheet adjacent the pore opening being raised to the fusion temperature of the glass coating on the sleeve member thereby sealing the sleeve member in position, annealing the entire unit, filling the unit with a dry gas through the internal opening of the sleeve, and closing the internal opening of the sleeve with a screw member.

14. A method of sealing a pore opening in one of the spaced members of a multiple glazed unit which comprises providing an element having an opening therein, suspending the element in the pore opening with a low fusion point glass separating the element from the edges of the pore opening, heating the edges of the glass members to form the multiple glazed unit, the area adjacent the pore opening being raised to a temperature sufficient to cause the low fusion point glass to hermetically seal the element in the pore opening, and closing the opening in the element.

References Cited in the file of this patent

UNITED STATES PATENTS

| Number | Name | Date |
| --- | --- | --- |
| 770,222 | Cazin | Sept. 13, 1904 |
| 1,124,778 | Meuler | Jan. 12, 1915 |
| 1,296,165 | Costuma | Mar. 4, 1919 |
| 1,370,974 | Kirlin | Mar. 8, 1921 |
| 1,448,351 | Kirlin | Mar. 13, 1923 |
| 1,944,186 | Lee | Jan. 23, 1934 |
| 2,125,372 | Fox | Aug. 2, 1938 |
| 2,145,168 | Flagg | Jan. 24, 1939 |
| 2,248,644 | Reger et al. | July 8, 1941 |
| 2,321,414 | Parker | June 8, 1943 |
| 2,330,363 | Kaziska | Sept. 28, 1943 |
| 2,389,360 | Guyer et al. | Nov. 20, 1945 |
| 2,398,371 | Gerspacher | Apr. 16, 1946 |
| 2,399,526 | Warren, Jr. | Apr. 30, 1946 |
| 2,499,854 | Ellefson | Mar. 7, 1950 |

FOREIGN PATENTS

| Number | Country | Date |
| --- | --- | --- |
| 433,489 | Great Britain | Aug. 15, 1935 |